US012775371B2

(12) United States Patent
Zang et al.

(10) Patent No.: US 12,775,371 B2
(45) Date of Patent: Oct. 27, 2026

(54) DISPLAY METHOD AND APPARATUS FOR DISPLAYING BULLET COMPONENT WITHIN MULTIMEDIA RESOURCE

(71) Applicant: SHANGHAI BILIBILI TECHNOLOGY CO., LTD., Shanghai (CN)

(72) Inventors: Zhicong Zang, Shanghai (CN); Chaoran Li, Shanghai (CN); Sunrui Liu, Shanghai (CN); Jinhao Zhang, Shanghai (CN); Yicong Mei, Shanghai (CN); Lin Wang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 296 days.

(21) Appl. No.: 17/708,549

(22) Filed: Mar. 30, 2022

(65) Prior Publication Data

US 2022/0321974 A1 Oct. 6, 2022

(30) Foreign Application Priority Data

Mar. 30, 2021 (CN) ......................... 202110339044.7

(51) Int. Cl.
*G06F 3/04842* (2022.01)
*G06F 3/0481* (2022.01)
(Continued)

(52) U.S. Cl.
CPC ........ *G06F 3/04842* (2013.01); *G06F 3/0481* (2013.01); *H04N 21/4312* (2013.01);
(Continued)

(58) Field of Classification Search
CPC ........... H04N 21/4886; H04N 21/4316; H04N 21/4858; H04N 21/4882; H04N 21/4438;
(Continued)

(56) References Cited

U.S. PATENT DOCUMENTS 7,010,751 B2 * 3/2006 Shneiderman .......... G06F 16/58 707/E17.026
2004/0189868 A1 * 9/2004 Molaro .............. H04N 21/4884 348/600
(Continued)

FOREIGN PATENT DOCUMENTS

CN 1879077 A 12/2006
CN 104102431 A 10/2014
(Continued)

*Primary Examiner* — Irete F Ehichioya
*Assistant Examiner* — Phoebe X Pan
(74) *Attorney, Agent, or Firm* — BakerHostetler

(57) ABSTRACT

This disclosure describes techniques of display a multimedia resource. The techniques includes obtaining a multimedia resource and at least one bullet screen component associated with the multimedia resource; determining a relative position relationship between a play application and the at least one bullet screen component, and loading the at least one bullet screen component and the multimedia resource to the play application based at least in part on the relative position relationship; and displaying the multimedia resource and the bullet screen component through the play application.

19 Claims, 8 Drawing Sheets

(51) Int. Cl.
*H04N 21/431* (2011.01)
*H04N 21/443* (2011.01)
*H04N 21/485* (2011.01)
*H04N 21/488* (2011.01)

(52) U.S. Cl.
CPC ..... *H04N 21/4316* (2013.01); *H04N 21/4438* (2013.01); *H04N 21/4858* (2013.01); *H04N 21/4882* (2013.01)

(58) Field of Classification Search
CPC ........... H04N 21/4788; H04N 21/4884; H04N 21/4312; G06F 3/0481; G06F 3/04842; G06F 3/04847
See application file for complete search history.

(56) References Cited

U.S. PATENT DOCUMENTS

2007/0245243 A1* 10/2007 Lanza ................ H04N 7/17318 715/205
2009/0089830 A1* 4/2009 Chandratillake ............................ H04N 21/23418 725/32
2009/0092374 A1* 4/2009 Kulas ................. H04N 21/6125 386/282
2009/0094520 A1* 4/2009 Kulas .................. G06F 16/7867 707/999.102
2013/0113996 A1* 5/2013 Zhu .................... H04N 21/8543 348/565
2015/0033109 A1* 1/2015 Marek ................... G06F 16/438 715/230
2015/0052439 A1* 2/2015 Pasquarette ........... G06F 3/0486 715/731
2015/0149900 A1* 5/2015 Kawabata ............. G06F 3/0481 715/711
2017/0251240 A1* 8/2017 Peng ................ H04N 21/47205
2017/0289634 A1* 10/2017 E ........................ H04N 21/4532
2018/0267970 A1* 9/2018 Zhang ................ H04N 21/4722
2019/0096439 A1* 3/2019 Brouwer .......... H04N 21/44008
2019/0246165 A1* 8/2019 Brouwer .............. H04N 21/435
2019/0324612 A1* 10/2019 Du ........................ G06F 3/0481
2020/0106965 A1* 4/2020 Malia .................... A63F 13/812
2020/0260137 A1* 8/2020 Chen ................ H04N 21/47217
2022/0124421 A1* 4/2022 Wei ...................... H04N 21/845

FOREIGN PATENT DOCUMENTS

CN 104703018 A 6/2015
CN 106534993 A 3/2017
CN 106792087 A 5/2017
CN 107690078 A 2/2018
CN 110896495 A 3/2020
CN 111796827 A 10/2020
CN 112256169 A 1/2021
CN 112565911 A 3/2021
WO WO 2016/095384 A1 6/2016
WO WO-2019007281 A1 * 1/2019 ........... G06K 9/3266

* cited by examiner (a)

(b)

(c)

(a)

(b)

DISPLAY METHOD AND APPARATUS FOR DISPLAYING BULLET COMPONENT WITHIN MULTIMEDIA RESOURCE

CROSS-REFERENCE TO RELATED APPLICATION

The present application claims priority to Chinese Patent Application No. 202110339044.7, filed on Mar. 30, 2021, which is incorporated herein by reference in its entirety.

BACKGROUND

With the development of computer technologies, users have increasingly high impression experience requirements on watched/heard multimedia resources. Moreover, the users desire to conveniently adjust display effects of multimedia resources while they are watching/listening to the multimedia resources on a platform.

SUMMARY

In view of this, embodiments of this application provide a display method. This application also relates to a display apparatus, a computing device, and a computer readable storage medium, to resolve a problem in the existing technology that a multimedia resource and a touchable component cannot be synchronously adjusted.

According to a first aspect of the embodiments of this application, a display method is provided, including:

- obtaining a multimedia resource and a bullet screen component associated with the multimedia resource;
- determining a relative position relationship between a play application and the bullet screen component, and loading the bullet screen component and the multimedia resource to the play application based on the relative position relationship; and
- displaying the multimedia resource and the bullet screen component through the play application.

According to a second aspect of the embodiments of this application, a display apparatus is provided, including:

- an obtaining module, configured to obtain a multimedia resource and a bullet screen component associated with the multimedia resource;
- a determining module, configured to determine a relative position relationship between a play application and the bullet screen component, and load the bullet screen component and the multimedia resource to the play application based on the relative position relationship; and
- a play module, configured to display the multimedia resource and the bullet screen component through the play application.

According to a third aspect of the embodiments of this application, a computing device is provided, including a memory, a processor, and computer instructions stored in the memory and executable on the processor, where the processor, when executing the instructions, implements steps of the display method.

According to a fourth aspect of the embodiments of this application, a computer-readable storage medium is provided, storing computer instructions, where the instructions, when executed by a processor, implement steps of the display method.

This application provides a display method. After a multimedia resource and a bullet screen component associated with the multimedia resource are obtained, a relative position relationship between the bullet screen component and a play application may be first determined, then the bullet screen component and the multimedia resource are loaded to the play application based on the relative position relationship, and then the multimedia resource and the bullet screen component may be played through the play application, to achieve a display effect of integrating the bullet screen component and the multimedia resource, thereby further improving watching experience of a user.

DETAILED DESCRIPTION

Figure 1:
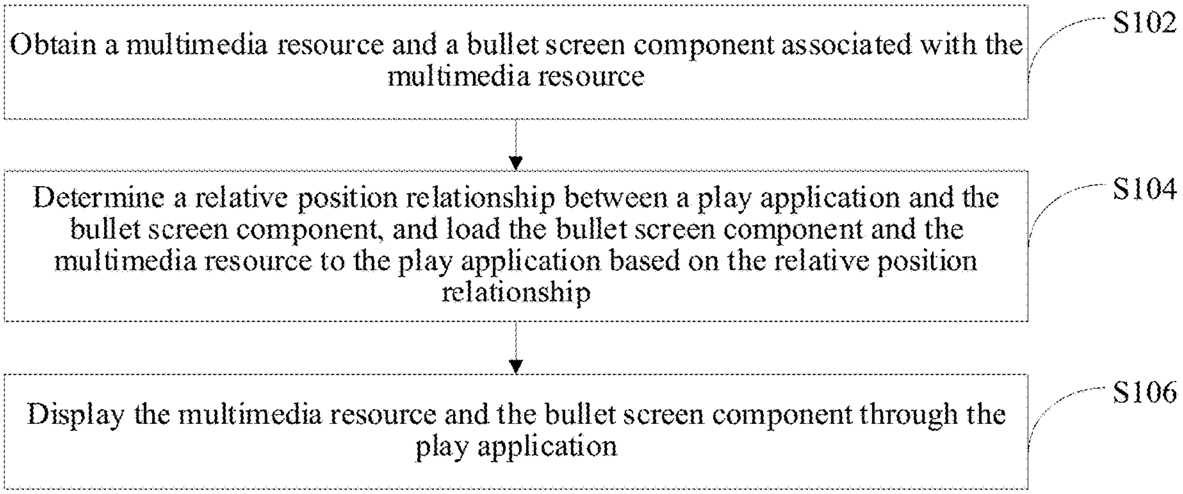
FIG. 1 is a flowchart of a display method according to an embodiment of this application.

In the following description, many specific details are provided to facilitate a full understanding of this application. However, this application may alternatively be implemented in other manners different from those described herein, and a person skilled in the art may make similar modifications without departing from the content of this application. Therefore, this application is not limited to the embodiments disclosed below.

The terms used in one or more embodiments of this application are merely used to describe the embodiments but are not intended to limit one or more embodiments of this application. The "a" and "the" in a singular form used in one or more embodiments of this application and the appended claims are also intended to include a plural form, unless other meanings are clearly indicated in the context. It should further be understood that the term "and/or" used in one or more embodiments of this application indicates and includes any or all possible combinations of one or more associated listed items.

It should be understood that although the terms such as first, and second may be used to describe various information in one or more embodiments of this application, but such information should not be limited to these terms. These terms are merely used to distinguish between information of the same type. For example, without departing from the scope of one or more embodiments of this application, the first may also be referred to as the second. Similarly, the second may also be referred to as the first. Depending on the context, for example, the word "if" used herein may be interpreted as "while" or "when" or "in response to determination."

This application provides a display method. This application also relates to a display apparatus, a computing device, and a computer readable storage medium. Detailed descriptions are made in the following embodiments one by one.

On a platform providing the multimedia resources to the users, to enable the users watching/listening to multimedia resources to conveniently adjust display effects of the multimedia resources, some touchable components are provided on an application displaying the multimedia resources, so that the users may complete a series of operations of adjusting the multimedia resources by means of touchable components. However, the touchable components and the multimedia resources that are being displayed are usually classified into two parts. As a result, display manners of the two parts have a relatively high separated effect, which affects use experience of the users to a great extent. In actual application, a multimedia resource that is being played and a touchable component that a user can touch are usually two separated parts in a play application, that is, after the user adjusts the multimedia resource that is being played, the touchable component does not follow up, and after the user triggers the touchable component, display information related to the multimedia resource does not follow up either. Therefore, a display effect that the touchable component and the multimedia resource cannot be synchronously played is formed. Moreover, the touchable component does not follow up, difficulty in tapping the touchable component by the user is further increased, which affects use experience of the user to a great extent. Therefore, an effective solution is urgently required to resolve the foregoing problem.

This application provides a display method. After a multimedia resource and a bullet screen component associated with the multimedia resource are obtained, a relative position relationship between the bullet screen component and a play application may be first determined, then the bullet screen component and the multimedia resource are loaded to the play application based on the relative position relationship, and then the multimedia resource and the bullet screen component may be played through the play application, to achieve a display effect of integrating the bullet screen component and the multimedia resource, thereby further improving watching experience of a user.

FIG. 1 is a flowchart of a display method according to an embodiment of this application, which specifically includes the following steps:

Step S102. Obtain a multimedia resource and a bullet screen component associated with the multimedia resource.

Step S104. Determine a relative position relationship between a play application and the bullet screen component, and load the bullet screen component and the multimedia resource to the play application based on the relative position relationship.

Step S106. Display the multimedia resource and the bullet screen component through the play application.

Specifically, the play application specifically refers to a web page or application program that can display a multimedia resource and a bullet screen component, that is, the display method provided in this application is applicable to a terminal device, and the terminal device may complete display of the multimedia resource and the bullet screen component associated with the multimedia resource by enabling the web page or application program. Correspondingly, the multimedia resource specifically refers to a video, an audio, an image, or the like displayed to the user; and correspondingly, the bullet screen component associated with the multimedia resource specifically refers to an interface component embedded in the multimedia resource. In some examples, bullet screen components associated with the multimedia resource comprise one or more selectable interface components embedded in the multimedia resource. Information (such as icon or name) about a publisher publishing the multimedia resource may be expressed to the watching user through the component, and moreover the bullet screen component may provide some function controls, so that the watching user may complete a corresponding function by tapping a function control.

Figure 2:
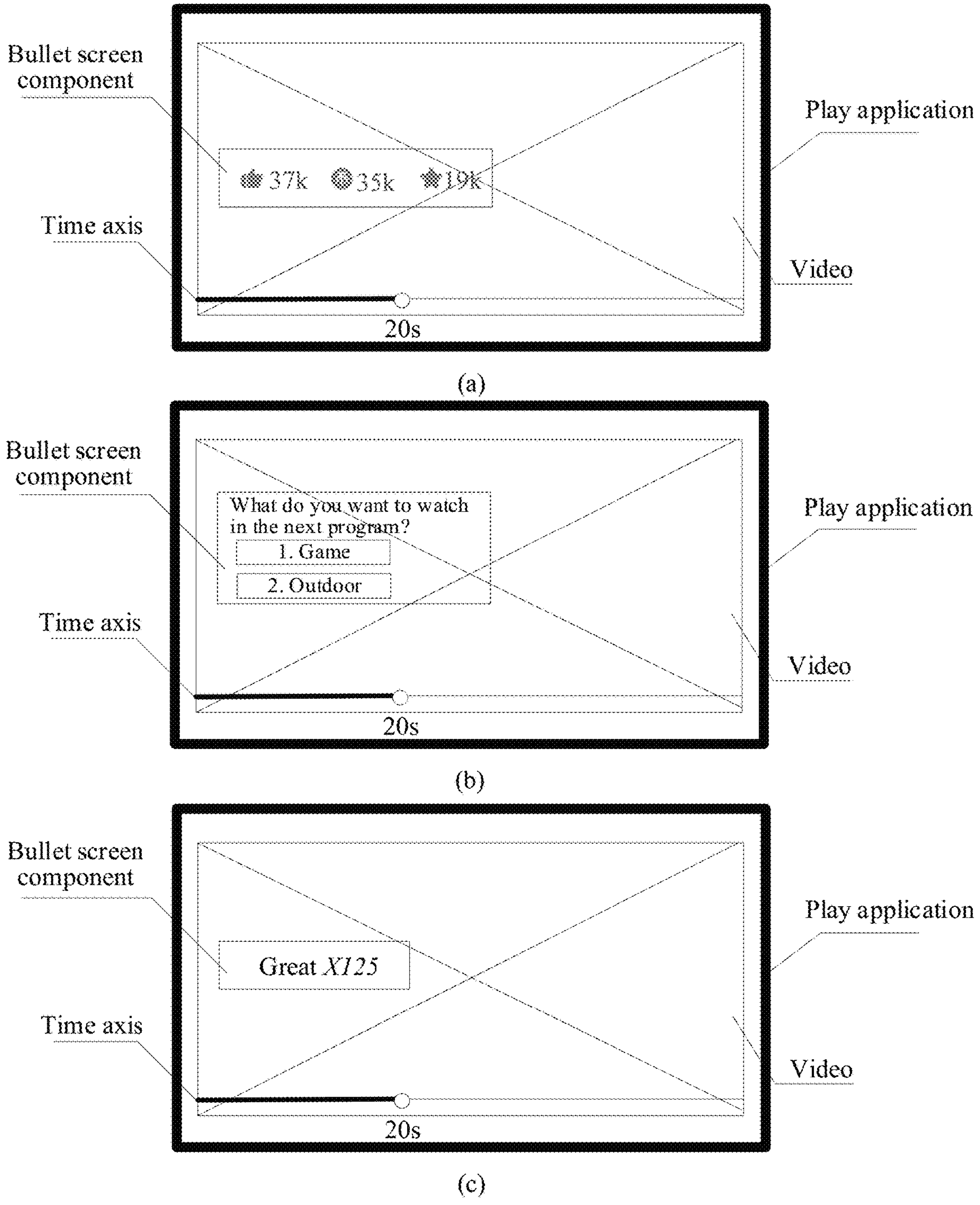
FIG. 2 is a schematic diagram of a bullet screen component according to an embodiment of this application.

For example, the bullet screen component may be a component with a like giving function, a following function, and a virtual gift sending function. Referring to a bullet screen component shown in (a) in FIG. 2, the user may complete like giving, following, and virtual gift sending by tapping any control, and may further jointly trigger the following and virtual gift sending controls simultaneously by touching and holding the like giving control. The bullet screen component may further be a component with a voting function. Referring to a bullet screen component shown in (b) in FIG. 2, the user may complete voting by tapping any control. The bullet screen component may further be a component with a double hit function. Referring to a bullet screen component shown in (c) in FIG. 2, the user may trigger the component by sending a bullet screen to present a bullet screen double hit, and trigger a bullet screen Easter egg animation according to the quantity of double hits. The bullet screen component may further be a component with a reserving function. By tapping a "reserve" button on the bullet screen component, the user may trigger the reserving function of the bullet screen component. For example, if the reserving function is to reserve live broadcast of an uploader of the video, the user receives a corresponding reminder when the uploader starts to broadcast. That is to say, functions of the bullet screen component are controls providing convenient operations and improving use experience for the user, and specific implementation functions of the controls are not limited in this embodiment.

Based on this, to play a multimedia resource with a better effect combined with a bullet screen component to the user, after the multimedia resource and the bullet screen component associated with the multimedia resource are obtained, a relative position relationship between a play application and the bullet screen component is determined, and then the play application and the bullet screen component are loaded to the play application based on the relative position relationship, to play the multimedia resource with the bullet screen component through the play application. That is to say, to achieve a play effect of embedding the two together, a coordinate system may be constructed based on a play region of the multimedia resource, and a region of the bullet screen component is loaded based on the coordinate system, to play the multimedia resource with the bullet screen component through the play application, thereby improving watching experience of the user.

It should be noted that, the multimedia resource is displayed in the play application. Therefore, the play application provides a large quantity of different types of multimedia resources to the user, while whether different multimedia resources have associated bullet screen components is decided by the publisher publishing the multimedia resource. In a case that the user submits a watching instruction for any multimedia resource in the play application, whether the multimedia resource has an associated bullet screen component is determined. If yes, the bullet screen component associated with the multimedia resource is synchronously displayed when the multimedia resource is displayed subsequently through the play application; and if not, only the multimedia resource is displayed subsequently through the play application, so that the bullet screen component associated with the multimedia resource may be decided by the publisher publishing the multimedia resource, to implement personalized processing of the publisher.

Further, the relative position relationship specifically refers to a relative position relationship between the bullet screen component and the play application. Through the relative position relationship, after the display region of the multimedia resource in the play application has a position change, the display region of the bullet screen component is synchronously updated, so that the bullet screen component is synchronously changed as the user modifies the display position of the multimedia resource, to achieve a visual effect of integrating the bullet screen component and the multimedia resource, thereby improving watching experience of the user. That is to say, the relative position relationship refers to a relatively motionless relationship between the display region of the bullet screen application and the display region of the multimedia resource in the play application. Regardless of which conversion (for example, scaling-down, scaling-up, rotation, or translation) occurs in the display region of the multimedia resource, the display region of the bullet screen component may be updated based on the relative position relationship, so that the multimedia resource and the bullet screen component after conversion still keep poses equal to those in a relative position relationship of an initial position (before conversion).

Based on this, after the user selects a multimedia resource having an associated bullet screen component, the multimedia resource and the bullet screen component associated with the multimedia resource are displayed through the play application enabled in the terminal device, so that the user may watch the bullet screen component while watching the multimedia resource. Moreover, to meet a condition that after the display region of the multimedia resource is adjusted subsequently, the display region of the bullet screen component may be synchronously updated, to achieve the display effect of integrating the two, a relative position relationship between the bullet screen component and the play application is determined, to achieve the display effect of following, by the bullet screen component, up with the multimedia resource based on this relative position relationship.

In this process, because the bullet screen component may support the user in tapping and touching, different bullet screen components may be freely set for different multimedia resources according to publishers of the multimedia resources. When the multimedia resources are browsed and watched by the user, different bullet screen components need to be created according to setting requirements of the publishers of the multimedia resources to implement subsequent display. Therefore, the bullet screen components are created based on generation of bullet screen component data associated with the multimedia resources. In this embodiment, a specific implementation is described as follows:

receiving a selection instruction submitted by the user for a multimedia resource list in the play application, and sending a resource request to a server to which the play application belongs according to the selection instruction; and receiving the multimedia resource and bullet screen component data associated with the multimedia resource that are returned by the server for the resource request, and generating the bullet screen component based on the bullet screen component data.

Specifically, the multimedia resource list specifically refers to a list formed by different types of multimedia resources displayed in the play application, and the user may select any one of the multimedia resources for play. Correspondingly, the selection instruction is an instruction submitted by the user for any multimedia resource in the multimedia resource list. The server of the play application specifically refers to a platform providing multimedia resources, and the server may respond to a resource request uploaded by the terminal device held by the user, to return a multimedia resource corresponding to the selection instruction of the user. The bullet screen component data specifically refers to data that needs to be used for creating the bullet screen component, the bullet screen component data may include size data of the bullet screen component, coordinate data of the bullet screen component, color data of the bullet screen component, function data of the bullet screen component, and the like, that is, the bullet screen component data refers to data that needs to be used for generating the bullet screen component, and the bullet screen component data may be autonomously controlled by the publisher publishing the multimedia resource. That is to say, the color, the position, the size, the function, and the like of the bullet screen component may be all set by the publisher as required, and a specific setting manner is not limited in this embodiment.

Based on this, in a case that the selection instruction submitted by the user for the multimedia resource in the play application is received, a resource request is sent to a server to which the play application belongs according to the selection instruction, then the multimedia resource returned by the server for the resource request and the bullet screen component data associated with the multimedia resource are received, and finally the bullet screen component may be created based on the bullet screen component data, so that the multimedia resource and the bullet screen component associated with the multimedia resource may be displayed subsequently through the play application.

During specific implementation, whether the multimedia resources included in the multimedia resource list have associated bullet screen components is set by publishers of the multimedia resources. Therefore, the display method provided in this application is applicable to a scenario in which a multimedia resource selected by the user has a bullet screen component set by a publisher, so that after the display region of the multimedia resource is adjusted subsequently, the display region of the bullet screen component is synchronously updated.

Furthermore, after the multimedia the bullet screen component and the multimedia resource are obtained, the multimedia resource and the bullet screen component may be displayed through the play application. A position in which the bullet screen component and the multimedia resource are displayed through the play application and a display time are both controlled by the publisher of the multimedia resource, and therefore also need to be determined according to the bullet screen component data during display. In this embodiment, a specific implementation is described as follows:

parsing the bullet screen component data, to obtain display time data and display coordinate data;

determining a component display interval of the bullet screen component in the multimedia resource according to the display time data, and determining a component display region of the bullet screen component according to the display coordinate data;

configuring, in the component display interval in the multimedia resource, the bullet screen component based on the component display region, and displaying the multimedia resource carrying the bullet screen component through the play application; and display the multimedia resource and the bullet screen component in a case that the play application displays the multimedia resource reaching a start moment of the component display interval.

Specifically, the display time data specifically refers to data corresponding to a duration for which the bullet screen component is continuously displayed when the bullet screen component and the multimedia resource are displayed by the play application. Correspondingly, the component display interval is a corresponding display interval in the multimedia resource from the time when the bullet screen component begins to be displayed to the time when the bullet screen component stops being displayed. If a play length of a video is 50 s, and the bullet screen component begins to be displayed when the video is played to 12 s, and stops being displayed when the video is played to 20 s, the component display interval is 12 s to 20 s in the video. The display coordinate data specifically refers to coordinate data corresponding to a position of displaying the bullet screen component relative to the multimedia resource in the play application when the bullet screen component and the multimedia resource are displayed by the play application. Correspondingly, the component display interval specifically refers to a region corresponding to a position of the bullet screen component displayed by the play application in the play application. That is to say, when the play application plays the multimedia resource and the multimedia resource is played to the component display interval, the bullet screen component is displayed from the component display position until the end of the component display interval.

Based on this, after the multimedia resource and the bullet screen component data associated with the multimedia resource are received, the bullet screen component data may be parsed, to obtain the display time data and the display coordinate data corresponding to the bullet screen component. Then, a component display interval of the bullet screen component in the multimedia resource may be determined according to the display time data, and a component display region of the bullet screen component may be determined according to the display coordinate data. After the component display interval and the component display region are determined, the bullet screen component may be configured according to the component display interval and the component display region, so that the user may display the multimedia resource carrying the bullet screen component through the play application. In a case that the moment at which the play application displays the multimedia resource reaches a start moment of the component display interval, it indicates that while the multimedia resource is displayed through the play application, the bullet screen component associated with the multimedia resource is also displayed. In this case, the bullet screen component may be rendered, and displayed through the play application together with the multimedia resource, so that the user may touch the bullet screen component while browsing the multimedia resource.

It should be noted that, the bullet screen component needs to be displayed together with the multimedia resource through the play application. Therefore, when the component display region is determined based on the display coordinate data, a coordinate system may be created based on the display region of the multimedia resource, thereby making it more convenient to determine the component display region of the bullet screen component, so that when the bullet screen component is displayed, it may be more convenient for the user to watch the multimedia resource and touch the bullet screen component in a position set by the publisher of the multimedia resource.

In actual application, a coordinate system formed by an X axis and a Y axis may be established by using the top left corner of display region of the multimedia resource as an origin coordinate (the multimedia resource fills the display region and is displayed), then the display coordinate data is read from the bullet screen component data, and the component display region is determined in the foregoing coordinate system based on this, and is used for subsequently displaying the bullet screen component.

For example, the user opens a web page B through a browser to watch a video. After the web page B is opened, a list including different types of videos (cartoon videos, sports videos, popular science videos, movie videos, game videos, and the like) is displayed in the web page. After the user selects a video L of the cartoon videos, a resource request for requesting the video L is sent to a server of the web page B according to a selection instruction of the user, and then the video L and bullet screen component data associated with the video L returned by the server for the resource request are received (because a publisher of the video L sets a bullet screen component when publishing the video, the server returns the video L and the bullet screen component data, and a control function included in the bullet screen component is also controlled by the publisher. In this embodiment, a description is made by using an example in which the bullet screen component includes one "like giving" control and one "following" control).

Further, after the bullet screen component data is received, the bullet screen component may be rendered through the terminal device. Because the display position and time of the bullet screen component are decided by the publisher, the bullet screen component data needs to be parsed, to obtain the display time data and the display coordinate data of the bullet screen component. The bullet screen component data is shown in Table 1:

TABLE 1

| Bullet screen component | | |
|---|---|---|
| Duration | int* | Bullet screen duration |
| PosX | Flcat* | Bullet screen coordinate |
| PosY | Flcat* | Bullet screen coordinate |
| Icon | string | Bullet screen background |
| Type | int* | Bullet screen component type |

Because different bullet screen components have different implementations, a type of a bullet screen component (the bullet screen component may include only a following control, or following control+like giving control, or following control+like giving control+collecting control+virtual gift sending control) may be determined through the bullet screen table 1. Based on this, it is determined that the bullet screen component includes the "like giving" control and the "following" control, and then it is determined that the display time data is 20 s to 50 s and the display coordinate data is (224, −150). That is to say, the bullet screen component begins to be displayed when the video L is played to 20 s, and the display position is 224 logic units in the direction of the X axis and −150 logic units in the direction of the Y axis in the display region of the video L. Based on this, the display interval of the bullet screen component in the video L may be determined according to the display time data of the bullet screen component, and the display region of the bullet screen component may be determined according to the display coordinate data; then the bullet screen component may be configured based on the display interval in the video L and the display region; and then the video L carrying the bullet screen component begins to be played through the web page B, and the play effect is shown in the schematic diagram in (a) in FIG. 3. Because the video L just begins to be played, the bullet screen component is not displayed. When the video L is played to 20 s, it indicates that the bullet screen component needs to be displayed. In this case, the video L begins to be continuously played and the bullet screen component is displayed, and the display effect is shown in the schematic diagram in (b) in FIG. 3, so that when the user watches the video L, the user may "give a like" to the video and/or "follow" the publisher, the user does not need to suspend the video to select a position of a particular control to complete the foregoing operation, thereby further improving use experience of the user.

To sum up, the display interval and the display region of the bullet screen component may be precisely determined through the display time data and the display coordinate data, so that the terminal device may precisely configure the bullet screen component that is set by the publisher onto the multimedia resource, and may synchronously display the bullet screen component while playing the multimedia resource, and it is convenient for the user to complete some relatively simple operations through the bullet screen component without affecting the display of the multimedia resource, thereby further improving watching experience of the user.

Moreover, in the process of displaying the bullet screen component and the multimedia resource through the play application, the bullet screen component provides a touchable component with a simple function to the user, and the multimedia resource is only a resource such as a watched video or image; and when the multimedia resource is displayed, the bullet screen component is also displayed for a period of time together. Therefore, to enable the user to synchronously adjust the bullet screen component while adjusting the multimedia resource (changing the display size, angle, position, and the like of the multimedia resource) in the period of time, to achieve the display effect of integrating the two, the multimedia resource may be displayed through the resource display region, and the bullet screen component may be displayed through the component display region, so that after the resource display region is adjusted by the user, the component display region may be synchronously updated, to achieve the display effect of integrating the two. In this embodiment, a specific implementation is described as follows:

- determining a resource display region and an interval display region in the play application, and using a region relative position relationship between the resource display region and the component display region as the relative position relationship; and
- loading, based on the relative position relationship, the multimedia resource to the resource display region and the bullet screen component to the component display region; and
- displaying the multimedia resource through the resource display region in the play application, and displaying the bullet screen component through the component display region in the play application.

Specifically, the resource display region specifically refers to a region used by the play application to display the multimedia resource, and the component display region is a region used by the play application to display the bullet screen component. It should be noted that, the component display region may be located in the resource display region, or may be located out of the resource display region, and the size of the component display region may be less than or equal to that of the resource display region.

Based on this, the bullet screen component and the multimedia resource are both displayed by the play application, and the position of displaying the bullet screen component is actually related to the display region of the multimedia resource (the position that is set by the publisher in the multimedia resource). Therefore, the relative position relationship between the play application and the bullet screen component may be determined by determining the relative position relationship between the component display region and the resource display region, and then the bullet screen component and the multimedia resource are loaded to the play application based on the relative position relationship; the multimedia resource is displayed through the resource display region in the play application, and the bullet screen component is displayed through the component display region; and a region relative position relationship between the resource display region and the component display region (a relative position relationship between such two initial positions as the initial position of the display region of the multimedia resource and the initial position the display region of the bullet screen component) may be determined, and the region relative position relationship may be used as the relative position relationship, so that after the resource display region is changed subsequently, the component display region may be updated, to achieve a better display effect.

It should be noted that, when the multimedia resource is displayed in the resource display region, and the bullet screen component is displayed in the component display region, the display size of the multimedia resource is equal to the size of the resource display region, and the display size of the bullet screen component is equal to the size of the component display region. That is to say, the multimedia resource that is being displayed fully fills the resource display region, and the bullet screen component that is being displayed fully fills the component display region, thereby making it convenient for the user to subsequently adjust the display form of the multimedia resource that is being displayed.

Figure 3:
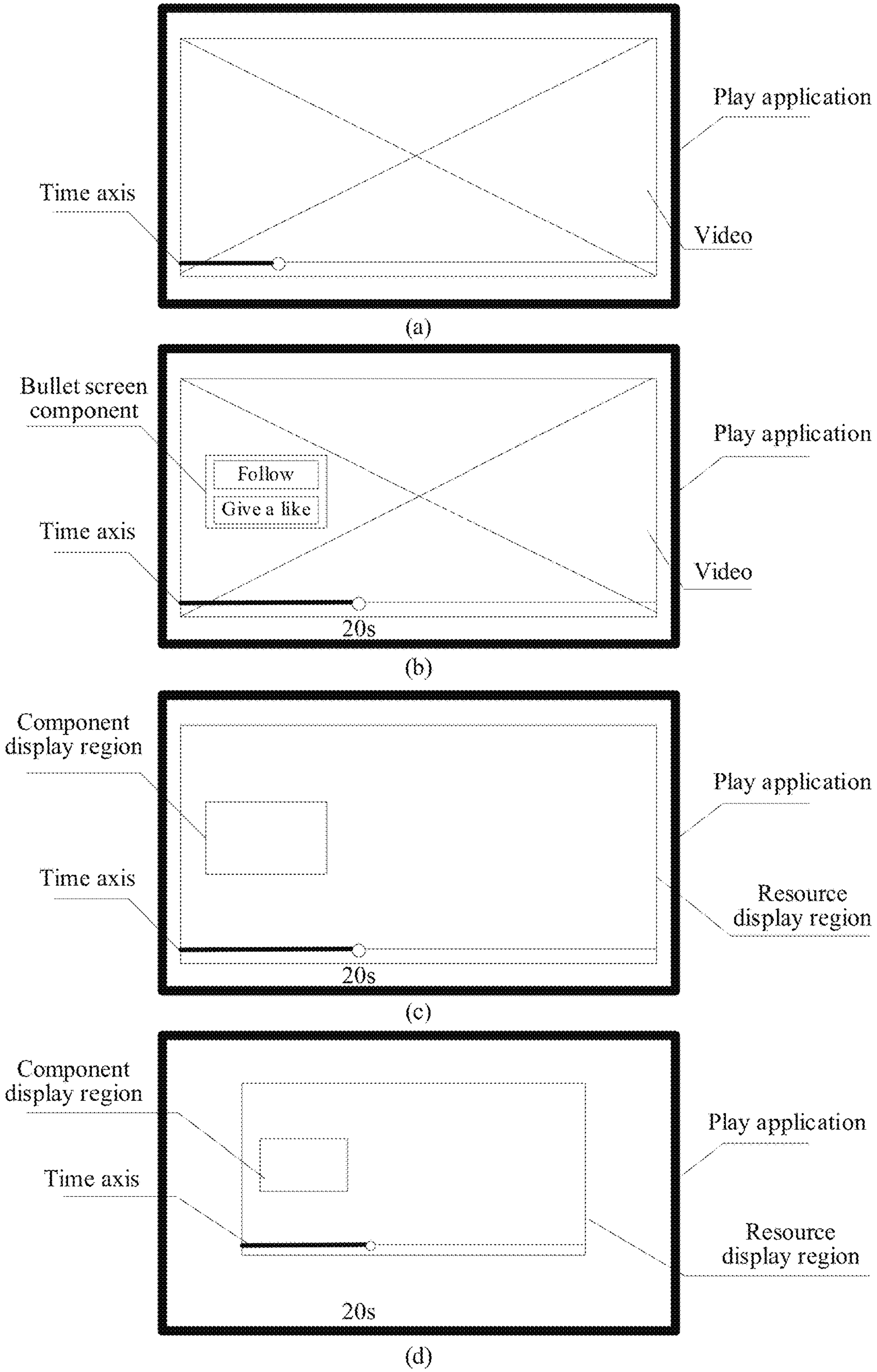
FIG. 3 is a schematic diagram of displaying a multimedia resource and a bullet screen component according to an embodiment of this application.

Referring to the schematic diagram shown in (c) in FIG. 3, the video L that is being played is added to the resource display region, and the bullet screen component that is being displayed is added to the component display region, so that when the bullet screen component and the video L are displayed simultaneously, the display effect shown in (b) in FIG. 3 is achieved.

To sum up, to make it convenient for the user to synchronously update the display form of the bullet screen component subsequently while adjusting the resource display region, the multimedia resource is displayed through the resource display region, and the bullet screen component is displayed through the component display region; and the relative position relationship between the resource display region and the component display region is determined, to lay a foundation for subsequent adjustment and update processing.

Furthermore, after the multimedia resource and the bullet screen component are played through the play application, to achieve the play effect of following, by the bullet screen component, up with the multimedia resource, the following step S1062 to step S1066 may be implemented, and details are described as follows:

Step S1062. Adjust, in a case that a parameter adjustment instruction submitted by a user for the play application is received, a display region of the multimedia resource in the play application according to the parameter adjustment instruction, to obtain a first display region of the multimedia resource.

Specifically, based on the foregoing displaying the multimedia resource and the bullet screen component through the play application, further, in a case that a parameter adjustment instruction submitted by the user for the play application is received, it indicates that the multimedia resource that is being displayed does not meet the watching requirement of the user, and the user needs to adjust the display form of the multimedia resource that is being displayed. In this case, the display region of the multimedia resource displayed in the play application may be adjusted according to the parameter adjustment instruction submitted by the user, to obtain the first display region corresponding to the multimedia resource, so that the multimedia resource is displayed subsequently through the first display region in the play application.

Based on this, the parameter adjustment instruction specifically refers to an instruction to adjust, by the user, the display region of the multimedia resource in the play application, and the parameter adjustment instruction includes but is not limited to a region size adjustment instruction, a region rotation adjustment instruction, and a region position adjustment instruction. The region size adjustment instruction specifically refers to a corresponding instruction to perform size adjustment on the display region of the multimedia resource in the play application. The region rotation adjustment instruction specifically refers to a corresponding instruction to perform rotation adjustment on the display region of the multimedia resource in the play application. The region position adjustment instruction specifically refers to performing position adjustment on the display region of the multimedia resource in the play application.

That is to say, in a case that the multimedia resource that is being displayed through the play application does not meet the watching requirement of the user, the user may perform size, rotation, and/or position adjustment on the display region displaying the multimedia resource by submitting the region size adjustment instruction, the region rotation adjustment instruction, and/or the region position adjustment instruction, to obtain the first display region meeting the watching requirement of the user, so that the multimedia resource continues to be displayed subsequently through the first display region.

It should be noted that, because the size adjustment, the rotation adjustment, and the position adjustment on the display region of the multimedia resource belong to different types of adjustments performed on the display region, the user may submit at least one parameter adjustment instruction at one same moment, that is, the user may submit the region rotation adjustment instruction and/or the region position adjustment instruction while submitting the region size adjustment instruction.

For example, an action gesture of triggering the region size adjustment instruction is "two fingers diverge by a specific distance and tap a terminal screen simultaneously, and then the display region of the multimedia resource may be scaled up or scaled down by changing the distance between the two fingers"; an action gesture of triggering the region rotation adjustment instruction is "two fingers diverge by a specific distance and tap a terminal screen simultaneously, and then the display region of the multimedia resource is rotated leftward or rightward by rotating one of the fingers"; and an action gesture of triggering the region position adjustment instruction is "two fingers diverge by a specific distance and tap a terminal screen simultaneously, and then the display region of the multimedia resource may be moved leftward or rightward by moving the two fingers leftward or rightward".

Based on this, a current action of the user is: an index finger and a middle finger diverge by a specific distance and tap a terminal screen simultaneously, and the middle finger is rotated around the index finger while reducing the distance between the two fingers. In this case, it may be determined according to the gesture action of the user that the user needs to scale and rotate the display region displaying the multimedia resource. In this case, the terminal device receives the region size adjustment instruction and the region rotation adjustment instruction, and then when the display region of the multimedia resource is adjusted based on the region size adjustment instruction and the region rotation adjustment instruction, the region needs to be rotated while scaling down the region, and the finally obtained first display region is the scaled down and rotated display region.

It should be noted that, the region size adjustment instruction, the region rotation adjustment instruction, and the region position adjustment instruction may be simultaneously or separately triggered according to a requirement of the user, and a combination form of the instructions may be set according to an actual application requirement, and is not limited in this embodiment. When any one or more instructions are received, the any one or more instructions may be used as the parameter adjustment instruction, used for subsequently adjusting the display region of the multimedia resource, to generate the first display region.

Further, for the process of adjusting the display region of the multimedia resource according to the parameter adjustment instruction, a specific implementation is described as follows:

parsing the parameter adjustment instruction to obtain an adjustment parameter, and determining a region parameter of the display region of the multimedia resource in the play application; and adjusting the region parameter based on the adjustment parameter, and updating the display region of the multimedia resource in the play application according to an adjustment result, to obtain the first display region.

Specifically, the adjustment parameter specifically refers to a parameter that needs to be used for adjusting the display region of the multimedia resource. The adjustment parameter is determined according to the parameter adjustment instruction, and the parameter adjustment instruction is submitted by the user. Therefore, the adjustment parameter is determined based on a requirement of the user. Correspondingly, the region parameter specifically refers to a parameter corresponding to the display region of the multimedia resource when the play application plays the multimedia resource, that is, a parameter corresponding to the display region of the multimedia resource before adjustment.

Based on this, after the parameter adjustment instruction is received, the parameter adjustment instruction may be parsed to obtain the adjustment parameter, and the region parameter of the multimedia resource in the display region in the play application may be determined; and then, the region parameter may be adjusted according to the adjustment parameter, and a parameter corresponding to the display region of the multimedia resource after adjustment may be determined according to an adjustment result. That is, in a case that the region parameter of the display region of the multimedia resource is the parameter after adjustment, use of the parameter for displaying the multimedia resource may better meet the watching experience of the user. Therefore, the display region of the multimedia resource in the play application may be updated according to the adjustment result, to obtain the first display region corresponding to the multimedia resource, so that the multimedia resource may be subsequently displayed in the first display region in the play application.

Continuing to use the foregoing example, in a case that displayed content shown in (b) in FIG. 3 is displayed through the web page B, the parameter adjustment instruction submitted by the user through the web page B is received. In this case, the region parameter (667*320) of the display region of the video L in the web page B is determined while parsing the parameter adjustment instruction to obtain the adjustment parameter (the display region of the video L is scaled down 1.5 times). In this case, the region parameter may be adjusted according to the adjustment parameter, and it is determined that the adjusted region parameter of the display region is (444*213). Further, the display region of the video L in the web page B is adjusted through the adjusted region parameter (444*213) of the display region, to obtain the first display region [size: 444*213, centered] subsequently used for displaying the video L.

To sum up, the region parameter of the display region of the multimedia resource in the play application is adjusted through the adjustment parameter, the adjusted region parameter of the display region may be precisely determined, and then the display region is updated, to obtain the first display region corresponding to the watching requirement of the user, so that the multimedia resource continues to be displayed in the region.

Step S1064. Update a display region of the bullet screen component in the play application based on the first display region and the relative position relationship, to obtain a second display region of the bullet screen component.

Specifically, based on the foregoing adjusting the display region of the multimedia resource to the first display region, further, the bullet screen component and the multimedia resource are simultaneously displayed by the play application. Therefore, to display the display effect of integrating the bullet screen component and the multimedia resource to the user, the display region of the bullet screen component may be updated according to the display region of the multimedia resource after adjustment (the first display region), so that the display region of the bullet screen component may change with conversion of the display region of the multimedia resource.

In this process, if the display region of the bullet screen application is directly updated based on only the first display region, it is very easy to cause a deviation between an effect of displaying the bullet screen component in the updated display region and an effect of displaying the multimedia resource in the first display region. If the display region of the multimedia resource is scaled 1.5 times, and the display region of the bullet screen component is directly scaled based on only the scaled display region of the multimedia resource, a problem that the display effect of the scaled display region of the bullet screen component does not match the display effect of the scaled display region of the multimedia resource may be caused. Therefore, to resolve the foregoing problem, the display region of the bullet screen component in the play application may be updated based on the relative position relationship and the first display region, to obtain the second display region corresponding to the bullet screen component, where the second display region specifically refers to a display region obtained after the display region of the bullet screen component is converted as the display region of the multimedia resource is changed.

Based on this, after the adjustment on the display region of the multimedia resource is completed, the display region of the bullet screen component in the play application may be updated based on the first display region and the relative position relationship, to obtain the second display region of the bullet screen component, so that the bullet screen component and the multimedia resource may be subsequently displayed through the play application to display content after form conversion.

During specific implementation, the multimedia resource is displayed in the resource display region in the play application, and the bullet screen component is displayed in the component display region in the play application. Therefore, when the display region of the multimedia resource is adjusted, the resource display region is actually adjusted, and when the display region of the bullet screen component is updated, the component display region is actually updated. In this embodiment, a specific implementation is described as follows:

adjusting the resource display region of the multimedia resource in the play application according to the parameter adjustment instruction, to obtain the first display region of the multimedia resource; and updating the component display region of the bullet screen component in the play application based on the first display region and the relative position relationship, to obtain the second display region of the bullet screen component.

Continuing to use the foregoing example, in a case that a parameter adjustment instruction to scale down the display region of the video L 1.5 times is received, the resource display region of the video L may be scaled down 1.5 times based on the instruction, to obtain the first display region [size: 444*213, centered]. Moreover, the component display region of the bullet screen component is motionless relative to the resource display region, that is, after the resource display region is changed, the component display region is also changed. Therefore, the component display region of the bullet screen component may be updated based on the first display region [size: 444*213, centered], and the relative position relationship between the resource display region and the component display region, to obtain the second display region [size: 149*100, position (299,200)] of the bullet screen component, and the display effect is the display effect shown in (d) in FIG. 3.

Furthermore, the multimedia resource is content displayed to the user, and the bullet screen component is a component that may respond to the touch instruction of the user. Therefore, rendering of the bullet screen component and adjustment on the display region of the bullet screen component need to be each implemented through an individual image engine. If the rendering of the bullet screen component is completed through the play application, a problem that the bullet screen component cannot respond to the touch instruction of the user may be caused, and therefore the rendering may be implemented through an image engine in a communication relationship with the play application. In this embodiment, a specific implementation is described as follows:

generating, according to the first display region and the relative position relationship, region update information of updating the display region of the bullet screen component in the play application; and inputting the region update information to an image engine in a communication relationship with the play application, where the image engine updates the display region of the bullet screen component in the play application based on the region update information, to obtain the second display region.

Specifically, the image engine specifically refers to an engine that can update the display region of the bullet screen component. Systems of terminal devices carrying the play application may be different. Therefore, to be adaptable to terminal devices with a plurality of systems, the image engine may be Chronos, to implement a cross-platform supporting capability, that is, a set of code may be run on both IOS and Android without developing different image engines for different systems, thereby saving development resources to a great extent.

Further, the display region of the bullet screen component needs to be updated in time after the first display region is obtained through adjustment. Therefore, a communication relationship between the image engine and the play application needs to be established, and a communication protocol between the image engine and the play application may be set according to an actual requirement, where the preset communication protocol includes but is not limited to a TCP/IP communication protocol, a NetBEUI communication protocol, an IPX/SPX communication protocol, and the like. In actual application, a communication protocol conforming to a current application scenario may be selected according to an actual requirement, and is not limited in this application.

Based on this, after the first display region is determined, region update information of updating the display region of the bullet screen component may be generated according to the first display region and the relative position relationship, and then the region update information is sent to the image engine, so that update of the display region of the bullet screen component in the play application may be completed through the image engine, to obtain the second display region.

Continuing to use the foregoing example, in a case that the first display region [size: 444*213, centered] is determined, region update information (OnVideoSizeChanged) of the display region of the bullet screen component may be determined according to the first display region and the relative position relationship between the display region of the bullet screen component and the display region of the video L; then the region update information is inputted to the Chronos image engine installed in the terminal device, to complete update of the display region of the bullet screen component through the Chronos image engine, that is, a coordinate system constructed based on the display region of the video L is restored through service code; and then under the coordinate system, the display region of the bullet screen component is adjusted, to obtain the second display region [size: 149*100, position (299,200)], to be used for subsequently displaying the video L and the bullet screen component after adjustment.

To sum up, update of the display region of the bullet screen component is completed through an image engine in a communication relationship with the play application, so that not only the bullet screen component may be still normally displayed in a position after update, but also it can be ensured that the updated display region is motionless relative to the display region of the multimedia resource, thereby displaying the display effect of integrating the bullet screen component and the multimedia resource to the user.

Step S1066. Display the multimedia resource located in the first display region and the bullet screen component located in the second display region through the play application.

Specifically, based on the foregoing obtaining the first display region and the second display region, further, if it is determined that the display region displaying the multimedia resource and the display region displaying the bullet screen component are both changed, when the multimedia resource is subsequently displayed through the play application, the multimedia resource located in the first display region and the bullet screen component located in the second display region may be displayed, thereby achieving the display effect of integrating the bullet screen component and the multimedia resource.

Figure 4:
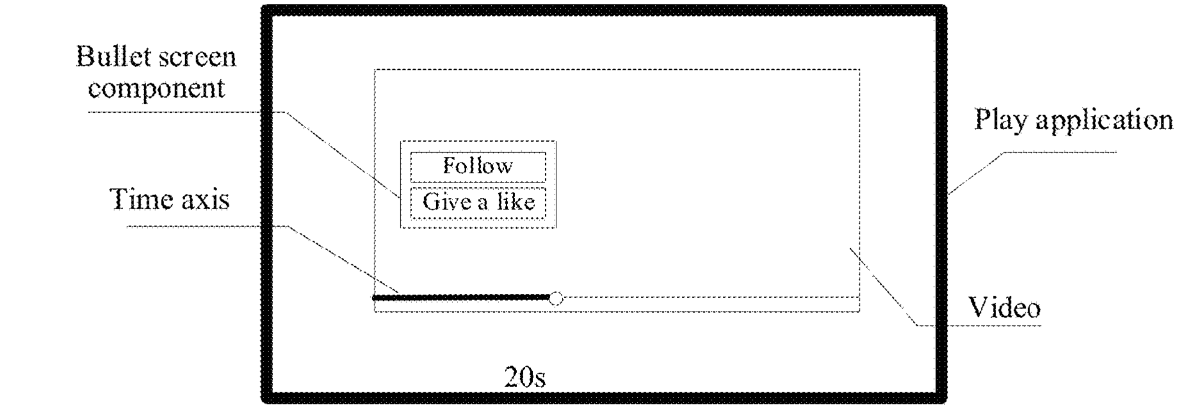
FIG. 4 is another schematic diagram of displaying a multimedia resource and a bullet screen component according to an embodiment of this application.
Figure 4:
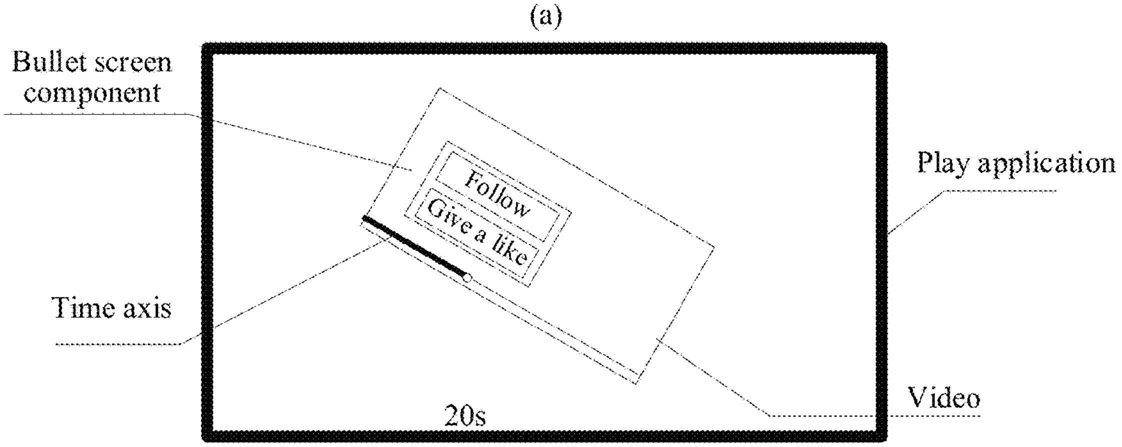
Figure 4:
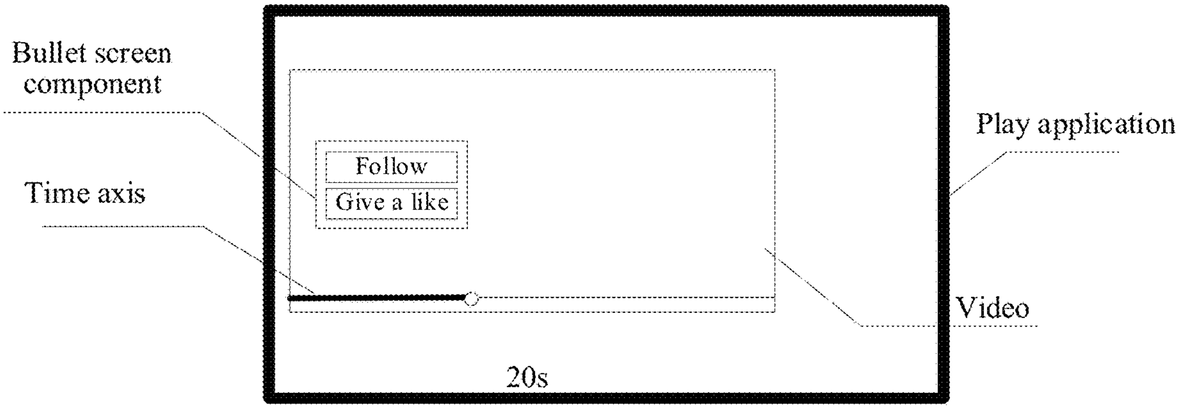

For example, the user scales the video L that is being played. In this case, the display region of the bullet screen component associated with the video L is synchronously updated, to generate the display effect shown in (a) in FIG. 4 (the display region of the video L is scaled down, and the display region of the bullet screen component is also scaled down). The user rotates the video L that is being played. In this case, the display region of the bullet screen component associated with the video L is synchronously updated, to generate the display effect shown in (b) in FIG. 4 (the display region of the video L is rotated, and the display region of the bullet screen component is also rotated). The user translates the video L that is being played. In this case, the display region of the bullet screen component associated with the video L is synchronously updated, to generate the display effect shown in (c) in FIG. 4 (the display region of the video L is translated leftward, and the display region of the bullet screen component is also translated leftward).

Moreover, the bullet screen component may provide some simple function to the user, such as following the publisher of the multimedia resource, giving a like to the multimedia resource that is being displayed, collecting the multimedia resource that is being displayed, or sending a virtual gift to the publisher. Therefore, when the user submits a touch instruction for the bullet screen component, a display state of a control in the bullet screen component is updated according to the touch instruction, to inform the user that the touch instruction has been responded to. In this embodiment, a specific implementation is described as follows:

receiving a touch instruction submitted by the user for the bullet screen component;

determining a first control corresponding to the touch instruction in the bullet screen component; and updating a display state of the first control based on the touch instruction.

Specifically, the touch instruction specifically refers to an instruction submitted by the user for any control in the bullet screen component. Correspondingly, the first control specifically refers to a control in the bullet screen component that responds to the touch instruction, and the display state specifically refers to a state corresponding to a different display effect before or after the first control is touched.

Based on this, in a case that a touch instruction submitted by the user for the bullet screen component is received, it indicates that the user needs to perform a specific operation. In this case, the first control corresponding to the touch instruction may be determined in the bullet screen component, and finally a display state of the first control is updated based on the touch instruction, to inform the user that the touch instruction has been responded to.

Moreover, the bullet screen component may be rendered by the image engine. Therefore, when a display state of a control in the bullet screen component is updated, the update may also be completed through the image engine. For example, the bullet screen component includes such four controls as "like giving", "virtual gift sending", "following", and "collecting". In a case that the user touches any one or more of the controls, if the image engine receives an OnRelationshipChainChanged message, the service code of the image engine perceives changes in display states of "like giving", "virtual gift sending", "following", and "collecting", and "like giving", "virtual gift sending", "following", and "collecting" may be updated according to a specific change situation; or if the image engine receives an UpdateRelationshipChain message, the service code may actively change display states of any one or more controls of "like giving", "virtual gift sending", "following", and "collecting"; or if the image engine receives an OnGestureEventReceived message, the service code may receive an input event (gesture operation or the like) of the user, to complete update of display states of any one or more controls of "like giving", "virtual gift sending", "following", and "collecting".

Furthermore, if the play application has a second control associated with the first control, after update of the display state of the first control is completed, to keep controls with the same function having the same display state, the second control needs to be updated. In this embodiment, a specific implementation is described as follows:

determining whether a second control associated with the first control exists in the play application; and updating, if yes, a display state of the second control according to an update result of the display state of the first control; or performing no processing if not.

Specifically, the second control specifically refers to a control in the play application that is associated with the first control. It should be noted that, the second control and the first control have the same function. That is to say, the function implemented by tapping the first control may also be implemented by tapping the second control.

Based on this, after the update of the display state of the first control is completed, to avoid a case that a display state of another control having the same function is not consistent with the display state of the first control, whether the second control associated with the first control exists in the play application may be detected. No processing is performed if not. If yes, it indicates that the second control having the same function as that of the first control exists in the play application, and a display state of the second control may be updated according to an update result of the display state of the first control.

Figure 5:
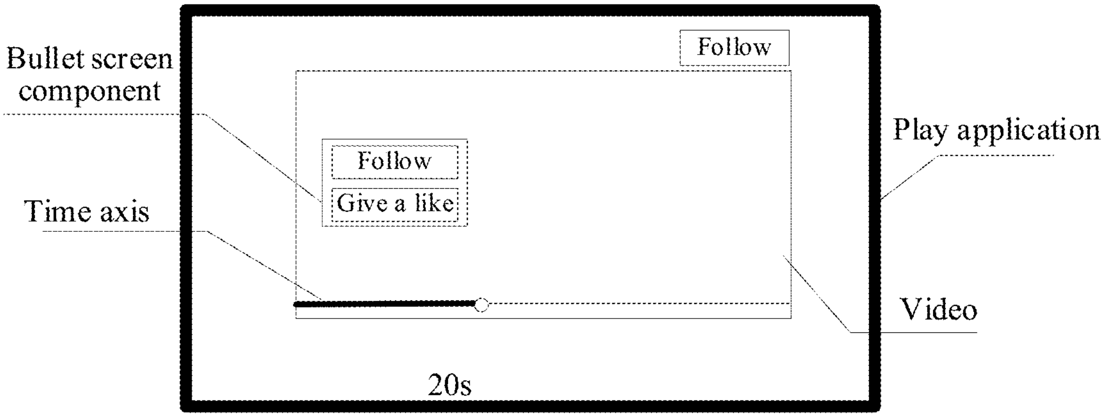
FIG. 5 is a schematic diagram of updating a display state of a control in a bullet screen component according to an embodiment of this application.
Figure 5:
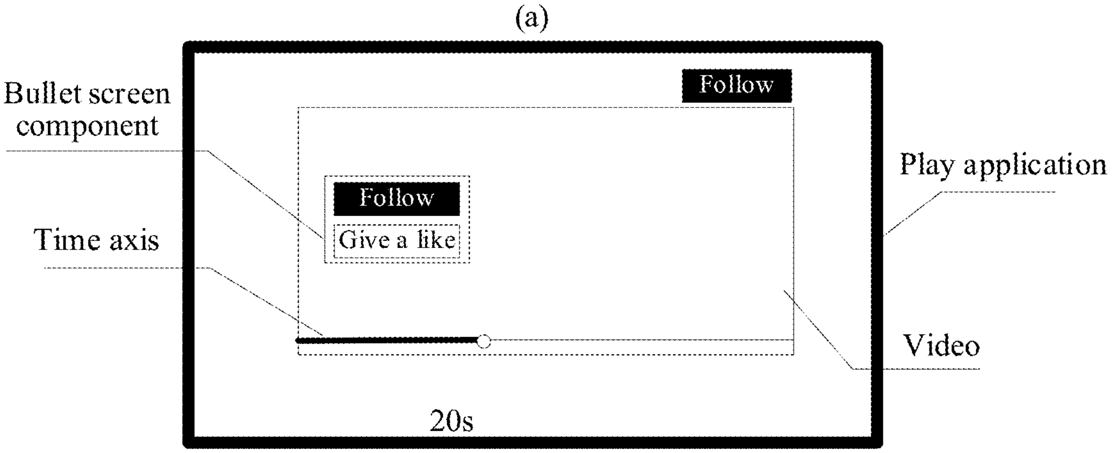

Referring to the schematic diagram shown in (a) in FIG. 5, the bullet screen component has the "following" control, and the play application also has the "following" control. After the user taps the "following" control in the bullet screen component, to avoid a case that the display effect of the "following" control in the play application is different from the display effect of the "following" control in the bullet screen component, the "following" control in the play application may also be updated, and the display effect after the update is shown in the schematic diagram in (b) in FIG. 5.

Moreover, it should be noted that, in a case that the user touches the second control in the play application, if the bullet screen component has the first control whose function is the same as that of the second control, the display state of the first control in the bullet screen component may be updated according to the updated display state of the second control, to achieve the same display effect.

To sum up, to enable controls having the same function to have the same display effect, after the display state of the first control is updated, the display state of the second control associated with the first control is also updated synchronously, thereby avoiding a case that controls having the same function have different display effects.

Figure 6:
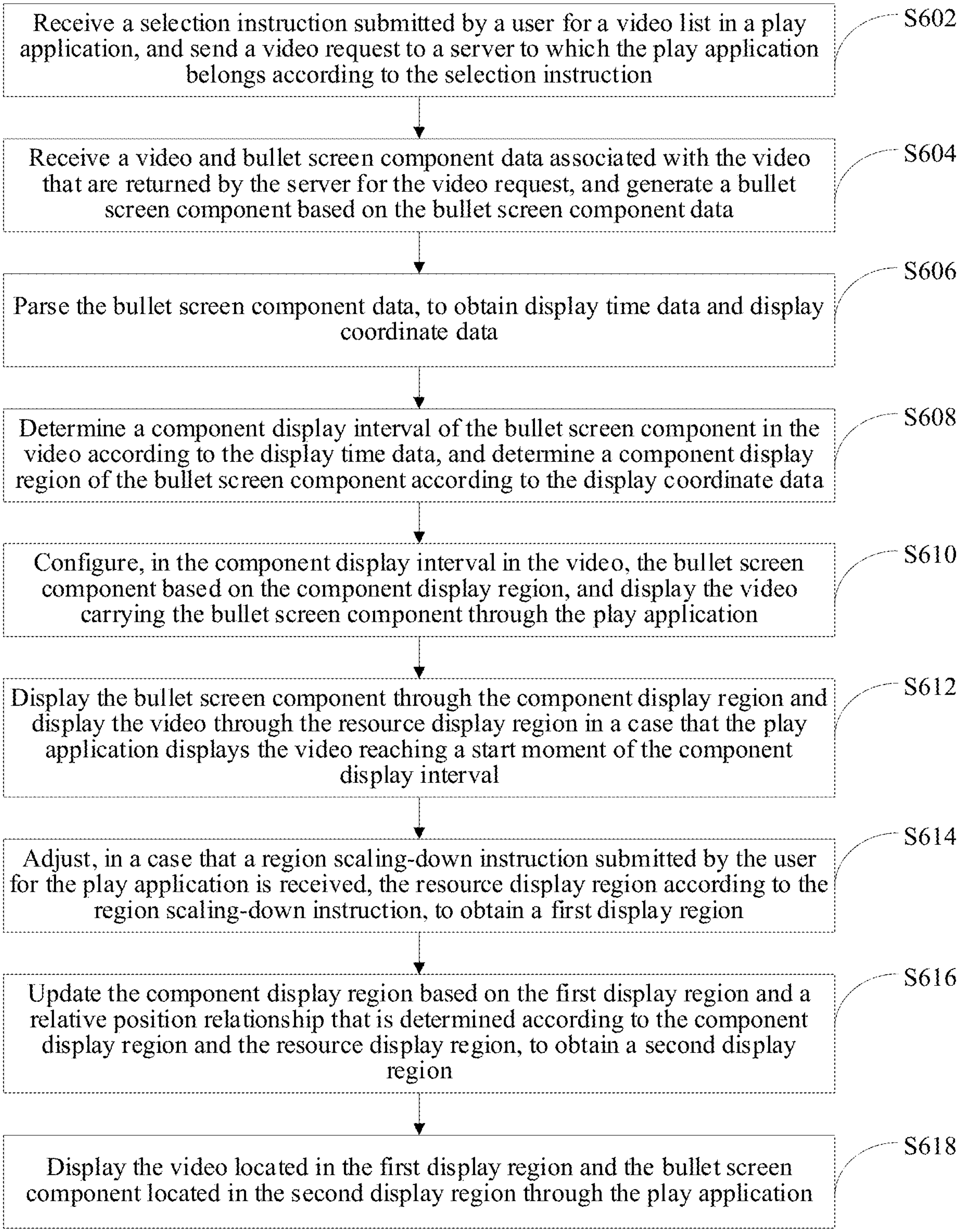
FIG. 6 is a processing flowchart of a display method applicable to a video play scenario according to an embodiment of this application.

Using application of a display method provided in this application to a video play scenario as an example, the display method is further described below with reference to FIG. 6. FIG. 6 is a processing flowchart of a display method applicable to a video play scenario according to an embodiment of this application, which specifically includes the following steps:

Step S602. Receive a selection instruction submitted by a user for a video list in a play application, and send a video request to a server to which the play application belongs according to the selection instruction.

Step S604. Receive a video and bullet screen component data associated with the video that are returned by the server for the video request, and generate a bullet screen component based on the bullet screen component data.

Step S606. Parse the bullet screen component data, to obtain display time data and display coordinate data.

Step S608. Determine a component display interval of the bullet screen component in the video according to the display time data, and determine a component display region of the bullet screen component according to the display coordinate data.

Step S610. Configure, in the component display interval in the video, the bullet screen component based on the component display region, and display the video carrying the bullet screen component through the play application.

Step S612. Display the bullet screen component through the component display region and display the video through the resource display region in a case that the play application displays the video reaching a start moment of the component display interval.

Step S614. Adjust, in a case that a region scaling-down instruction submitted by the user for the play application is received, the resource display region according to the region scaling-down instruction, to obtain a first display region.

Step S616. Update the component display region based on the first display region and a relative position relationship that is determined according to the component display region and the resource display region, to obtain a second display region.

Step S618. Display the video located in the first display region and the bullet screen component located in the second display region through the play application.

This application provides a display method. After the display region of the multimedia resource is adjusted, the display region of the bullet screen component may be synchronously updated, to form the display effect of integrating the bullet screen component and the multimedia resource, thereby further improving watching experience of the user.

Figure 7:
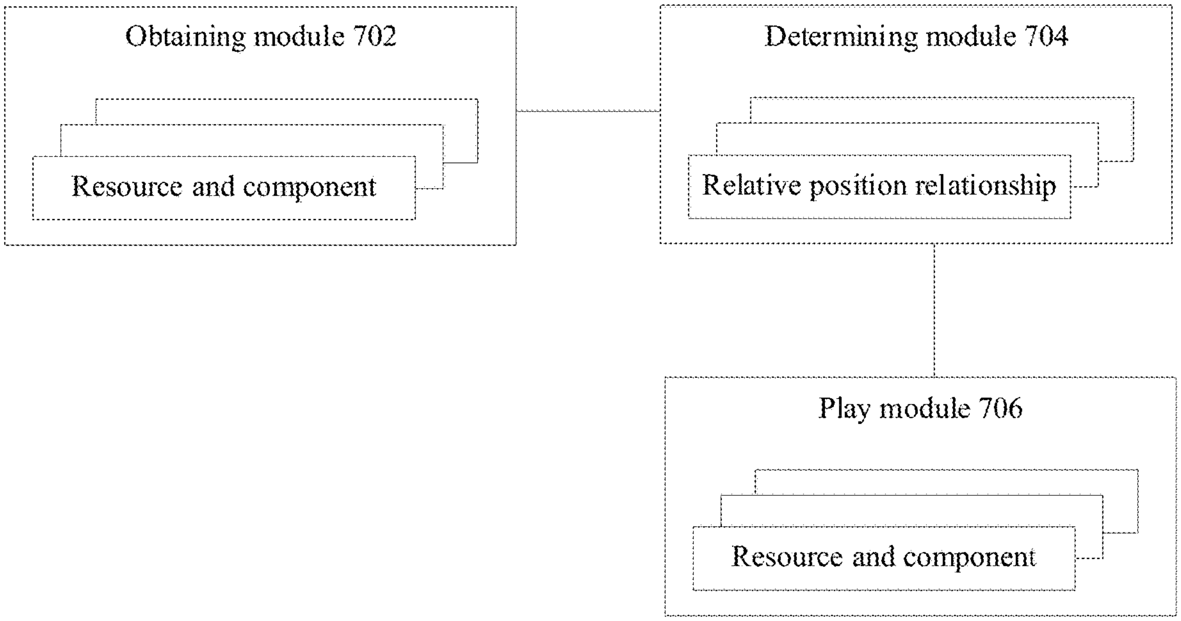
FIG. 7 is a schematic structural diagram of a display apparatus according to an embodiment of this application.

Corresponding to the foregoing method embodiment, this application further provides an embodiment of a display apparatus. FIG. 7 is a schematic structural diagram of a display apparatus according to an embodiment of this application. As shown in FIG. 7, the apparatus includes:

an obtaining module 702, configured to obtain a multimedia resource and a bullet screen component associated with the multimedia resource;

a determining module 704, configured to determine a relative position relationship between a play application and the bullet screen component, and load the bullet screen component and the multimedia resource to the play application based on the relative position relationship; and a play module 706, configured to display the multimedia resource and the bullet screen component through the play application.

In an optional embodiment, the display apparatus further includes:

an adjustment module, configured to adjust, in a case that a parameter adjustment instruction submitted by a user for the play application is received, a display region of the multimedia resource in the play application according to the parameter adjustment instruction, to obtain a first display region of the multimedia resource; update a display region of the bullet screen component in the play application based on the first display region and the relative position relationship, to obtain a second display region of the bullet screen component; and display the multimedia resource located in the first display region and the bullet screen component located in the second display region through the play application.

In an optional embodiment, the determining module 704 is further configured to:

determine a resource display region and an interval display region in the play application, and use a region relative position relationship between the resource display region and the component display region as the relative position relationship; and load, based on the relative position relationship, the multimedia resource to the resource display region and the bullet screen component to the component display region; and correspondingly, the play module 706 is further configured to:

display the multimedia resource through the resource display region in the play application, and display the bullet screen component through the component display region in the play application.

In an optional embodiment, the adjustment module is further configured to:

adjust the resource display region of the multimedia resource in the play application according to the parameter adjustment instruction, to obtain the first display region of the multimedia resource; and correspondingly, the updating a display region of the bullet screen component in the play application based on the first display region and the relative position relationship, to obtain a second display region of the bullet screen component includes:

updating the component display region of the bullet screen component in the play application based on the first display region and the relative position relationship, to obtain the second display region of the bullet screen component.

In an optional embodiment, the adjustment module is further configured to:

generate, according to the first display region and the relative position relationship, region update information of updating the display region of the bullet screen component in the play application; and input the region update information to an image engine in a communication relationship with the play application, where the image engine updates the display region of the bullet screen component in the play application based on the region update information, to obtain the second display region.

In an optional embodiment, the obtaining module 702 is further configured to:

receive a selection instruction submitted by the user for a multimedia resource list in the play application, and send a resource request to a server to which the play application belongs according to the selection instruction; and receive the multimedia resource and bullet screen component data associated with the multimedia resource that are returned by the server for the resource request, and generate the bullet screen component based on the bullet screen component data.

In an optional embodiment, the play module 706 is further configured to:

parse the bullet screen component data, to obtain display time data and display coordinate data; determine a component display interval of the bullet screen component in the multimedia resource according to the display time data, and determine a component display region of the bullet screen component according to the display coordinate data; configure, in the component display interval in the multimedia resource, the bullet screen component based on the component display region, and displaying the multimedia resource carrying the bullet screen component through the play application; and display the multimedia resource and the bullet screen component in a case that the play application displays the multimedia resource reaching a start moment of the component display interval.

In an optional embodiment, the display apparatus further includes:

a display state update module, configured to receive a touch instruction submitted by the user for the bullet screen component; determine a first control corresponding to the touch instruction in the bullet screen component; and update a display state of the first control based on the touch instruction.

In an optional embodiment, the display state update module is further configured to:

determine whether a second control associated with the first control exists in the play application; and update, if yes, a display state of the second control according to an update result of the display state of the first control.

In an optional embodiment, the adjustment module is further configured to:

parse the parameter adjustment instruction to obtain an adjustment parameter, and determine a region parameter of the display region of the multimedia resource in the play application; and adjust the region parameter based on the adjustment parameter, and update the display region of the multimedia resource in the play application according to an adjustment result, to obtain the first display region.

In an optional embodiment, the parameter adjustment instruction includes at least one of the following:

a region size adjustment instruction, a region rotation adjustment instruction, or a region position adjustment instruction; and correspondingly, the adjusting a display region of the multimedia resource in the play application includes:

performing size adjustment on the display region of the multimedia resource in the play application, and/or performing rotation adjustment on the display region of the multimedia resource in the play application, and/or performing position adjustment on the display region of the multimedia resource in the play application.

The display apparatus provided in this embodiment displays the multimedia resource and the bullet screen component through the play application, and determines the relative position relationship between the bullet screen component and the play application; adjusts, in a case that the parameter adjustment instruction submitted by the user is received, the display region of the multimedia resource in the play application according to the parameter adjustment instruction, to obtain the first display region; and then updates the display region of the bullet screen component in the play application based on the first display region and the relative position relationship, to obtain the second display region of the bullet screen component, and finally displays the multimedia resource located in the first display region and the bullet screen component located in the second display region through the play application, so that after the display region of the multimedia resource is adjusted, the display region of the bullet screen component may be synchronously updated, to form the display effect of integrating the bullet screen component and the multimedia resource, thereby further improving watching experience of the user.

An exemplary solution of a display apparatus according to the embodiments is described above. It should be noted that, the technical solution of the display apparatus and the technical solution of the display method belong to the same conception, and for detailed content of the technical solution of the display apparatus that is not described in detail, reference may be made to the description of the technical solution of the foregoing display method.

Figure 8:
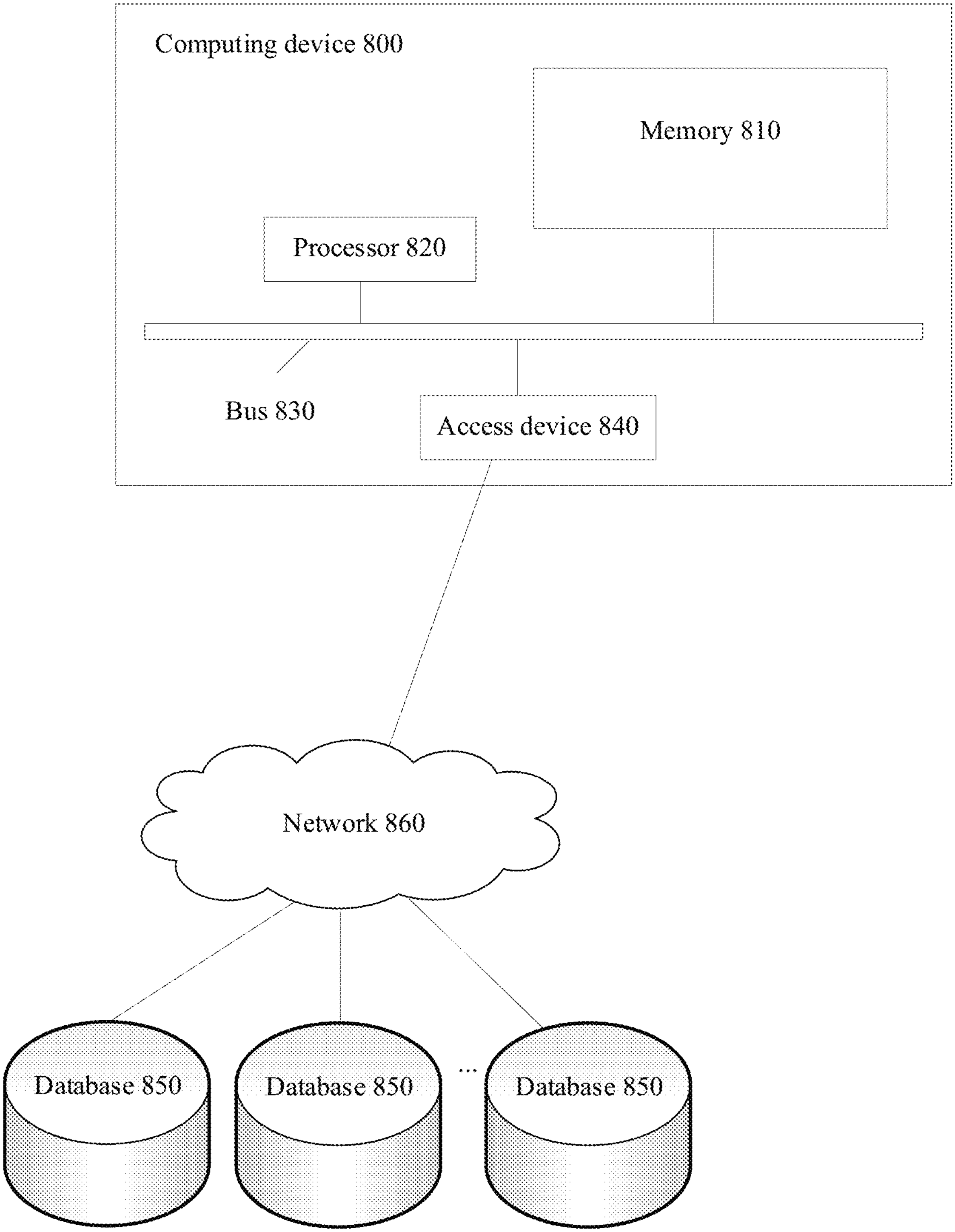
FIG. 8 is a structural block diagram of a computing device according to an embodiment of this application.

FIG. 8 is a structural block diagram of a computing device 800 according to an embodiment of this application. Components of the computing device 800 include, but are not limited to, a memory 810 and a processor 820. The processor 820 and the memory 810 are connected through a bus 830, and a database 850 is used for storing data.

The computing device 800 further includes an access device 840, and the access device 840 enables the computing device 800 to communicate through one or more networks 860. Examples of the networks include a public switched telephone network (PSTN), a local area network (LAN), a wide area network (WAN), a personal area network (PAN), or a combination of communication networks such as the Internet. The access device 840 may include one or more of wired or wireless network interfaces (for example, a network interface card (NIC)) of any types, such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, a near field communication (NFC) interface, and the like.

In an embodiment of this application, the foregoing components and other components not shown in FIG. 8 of the computing device 800 may be connected, for example, through the bus. It should be understood that the structural block diagram of the computing device shown in FIG. 8 is merely exemplary, and is not intended to limit the scope of this application. A person skilled in the art may add or replace other components according to a requirement.

The computing device 800 may be a stationary or mobile computing device of any type, including a mobile computer, a mobile computing device (for example, a tablet computer, a person digital assistant, a laptop computer, a notebook, or a netbook), a mobile phone (for example, a smartphone), a wearable computing device (for example, a smartwatch or smart glasses), a mobile device of another type, or a stationary computing device such as a desktop computer or a personal computer (PC). The computing device 800 may alternatively be a mobile or stationary server.

The processor 820, when executing instructions, implements steps of the display method.

An exemplary solution of a computing device according to the embodiments is described above. It should be noted that, the technical solution of the computing device and the technical solution of the display method belong to the same conception, and for detailed content of the technical solution of the computing device that is not described in detail, reference may be made to the description of the technical solution of the foregoing display method.

An embodiment of this specification further provides a computer-readable storage medium, storing computer instructions, where when the instructions are executed by a processor, steps of the display method described above are implemented.

An exemplary solution of a computer-readable storage medium according to the embodiments is described above. It should be noted that, the technical solution of the storage medium and the technical solution of the display method belong to the same conception, and for detailed content of the technical solution of the storage medium that is not described in detail, reference may be made to the description of the technical solution of the foregoing display method.

Specific embodiments of this application are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

The computer instructions include computer program code. The computer program code may be in a source code form, an object code form, executable file or some intermediate forms, or the like. The computer-readable medium may include: any entity or apparatus that is capable of carrying the computer program code, a recording medium, a USB flash drive, a removable hard disk, a magnetic disk, an optical disc, a read-only memory (ROM), a random access memory (RAM), an electric carrier signal, a telecommunication signal and a software distribution medium, and the like. It should be noted that, the content contained in the computer-readable medium may be appropriately increased or decreased according to the requirements of legislation and patent practice in jurisdictions. For example, in some jurisdictions, according to legislation and patent practice, the computer-readable medium does not include an electric carrier signal and a telecommunication signal.

It should be noted that, for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that the embodiments described in this specification all belong to exemplary embodiments, and the actions and modules are not necessarily required by this application.

In the foregoing embodiments, the description of each embodiment has respective focuses. For a part that is not described in detail in an embodiment, reference may be made to related descriptions in other embodiments.

The exemplary embodiments of this application disclosed above are only used to help explain this application. The optional embodiments do not describe all the details, and are not intended to limit this application to the specific implementations described. Obviously, many modifications and changes may be made according to the content of this application. These embodiments are selected and described in this application for better explaining the principles and practical applications of this application, so that a person skilled in the art can better understand use this application. This application is subject to the claims and their full scope and equivalents.

What is claimed is:

1. A method of improving a display effect by integrating bullet screen components into a video, comprising:

obtaining the video and at least one bullet screen component associated with the video, wherein the at least one bullet screen component comprises at least one function control configured to perform a corresponding function associated with the video based on the user input, and wherein the at least one function control comprises at least one of a control configured to follow a publisher of the video, a control configured to send a virtual gift to the publisher of the video, a control configured to collect the video as a favorite, or a control configured to give a like to the video;

determining a relative position relationship between the at least one bullet screen component and a play application, and loading the at least one bullet screen component and the video to the play application based at least in part on the relative position relationship;

displaying on a computing device the video in a first display region and the at least one bullet screen component in a second display region, wherein the second display region is located within the first display region;

generating an effect of embedding the at least one function control in the video by maintaining a relatively motionless relationship between the first display region and the second display region while playing the video in the play application, wherein the maintaining the relatively motionless relationship comprises at least one of synchronously scaling down the first display region and the second display region without scaling downing a play application window of the play application, synchronously rotating the first display region and the second display region without rotating the play application window, or synchronously translating the first display region and the second display region without translating the play application window;

receiving an instruction from a user via the at least one bullet screen component displayed in the second display region;

determining a first function control among the at least one function control comprised in the at least one bullet screen component in response to receiving the instruction; and changing a display state of the first function control to an updated display effect different from a display effect that was presented before receiving the instruction from the user.

2. The method according to claim 1, wherein after the displaying the video and the at least one bullet screen component through the play application, the method further comprises:

in response to receiving a parameter adjustment instruction via the play application, adjusting a display region of the video in the play application based on the parameter adjustment instruction to obtain the first display region of the video; and updating a display region of the at least one bullet screen component in the play application based on the first display region and the relative position relationship to obtain the second display region of the at least one bullet screen component.

3. The method according to claim 2, wherein the updating a display region of the at least one bullet screen component in the play application based on the first display region and the relative position relationship to obtain the second display region of the at least one bullet screen component comprises:

generating, based on the first display region and the relative position relationship, region update information indicative of updating the display region of the at least one bullet screen component in the play application; and inputting the region update information to an image engine in a communication relationship with the play application, wherein the image engine updates the display region of the at least one bullet screen component in the play application based on the region update information to obtain the second display region.

4. The method according to claim 2, wherein the adjusting a display region of the video in the play application based on the parameter adjustment instruction to obtain the first display region of the video comprises:

parsing the parameter adjustment instruction to obtain an adjustment parameter;

determining a region parameter of the display region of the video in the play application;

adjusting the region parameter based on the adjustment parameter; and updating the display region of the video in the play application based on an adjustment result to obtain the first display region.

5. The method according to claim 2, wherein the parameter adjustment instruction comprises at least one of a region size adjustment instruction, a region rotation adjustment instruction, or a region position adjustment instruction, and wherein the adjusting a display region of the video in the play application comprises at least one of:

performing a size adjustment on the display region of the video in the play application;

performing a rotation adjustment on the display region of the video in the play application; or performing a position adjustment on the display region of the video in the play application.

6. The method according to claim 1, wherein the determining a relative position relationship between the at least one bullet screen component and a play application comprises:

determining a resource display region in the play application and a component display region in the play application; and determining the relative position relationship between the at least one bullet screen component and the play application based on a region relative relationship between the resource display region and the component display region.

7. The method according to claim 6, wherein the displaying the video and the at least one bullet screen component comprises:

displaying the video through the resource display region in the play application; and displaying the at least one bullet screen component through the component display region in the play application.

8. The method according to claim 1, wherein the obtaining a video and at least one bullet screen component associated with the video comprises:

receiving an instruction of selecting the video from a video list in the play application;

sending a resource request to a server to which the play application belongs based on the instruction;

receiving the video and bullet screen component data associated with the video from the server; and generating the at least one bullet screen component based on the bullet screen component data.

9. The method according to claim 8, wherein the displaying the video and the at least one bullet screen component comprises:

parsing the bullet screen component data to obtain display time data and display coordinate data;

determining a component display period of displaying the at least one bullet screen component in the video based on the display time data;

determining a component display region of displaying the at least one bullet screen component based on the display coordinate data;

configuring the at least one bullet screen component based on the component display region;

displaying the video carrying the at least one bullet screen component through the play application; and displaying the at least one bullet screen component in response to determining that display of the video by the play application reaches a start point of the component display period.

10. The method according to claim 1, wherein the method further comprises:

determining whether there is a second function control associated with the first function control; and updating a display state of the second function control based on the updated display effect of the first function control in response to determining that there is the second function control associated with the first function control.

11. A system, comprising:

at least one processor; and at least one memory communicatively coupled to the at least one processor and comprising computer-readable instructions that upon execution by the at least one processor cause the at least one processor to perform operations comprising:

obtaining a video and at least one bullet screen component associated with the video, wherein the at least one bullet screen component comprises at least one function control configured to perform a corresponding function associated with the video based on the user input, and wherein the at least one function control comprises at least one of a control configured to follow a publisher of the video, a control configured to send a virtual gift to the publisher of the video, a control configured to collect the video as a favorite, or a control configured to give a like to the video;

determining a relative position relationship between the at least one bullet screen component and a play application, and loading the at least one bullet screen component and the video to the play application based at least in part on the relative position relationship;

displaying on a computing device the video in a first display region and the at least one bullet screen component in a second display region, wherein the second display region is located within the first display region;

generating an effect of embedding the at least one function control in the video by maintaining a relatively motionless relationship between the first display region and the second display region while playing the video in the play application, wherein the maintaining the relatively motionless relationship comprises at least one of synchronously scaling down the first display region and the second display region without scaling downing a play application window of the play application, synchronously rotating the first display region and the second display region without rotating the play application window, or synchronously translating the first display region and the second display region without translating the play application window;

receiving an instruction from a user via the at least one bullet screen component displayed in the second display region;

determining a first function control among the at least one function control comprised in the at least one bullet screen component in response to receiving the instruction; and changing a display state of the first function control to an updated display effect different from a display effect that was presented before receiving the instruction from the user.

12. The system according to claim 11, wherein after the displaying the video and the at least one bullet screen component through the play application, the operations further comprise:

in response to receiving a parameter adjustment instruction via the play application, adjusting a display region of the video in the play application based on the parameter adjustment instruction to obtain the first display region of the video; and updating a display region of the at least one bullet screen component in the play application based on the first display region and the relative position relationship to obtain the second display region of the at least one bullet screen component.

13. The system according to claim 12, wherein the updating a display region of the at least one bullet screen component in the play application based on the first display region and the relative position relationship to obtain the second display region of the at least one bullet screen component comprises:

generating, based on the first display region and the relative position relationship, region update information indicative of updating the display region of the at least one bullet screen component in the play application; and inputting the region update information to an image engine in a communication relationship with the play application, wherein the image engine updates the display region of the at least one bullet screen component in the play application based on the region update information to obtain the second display region.

14. The system according to claim 12, wherein the adjusting a display region of the video in the play application based on the parameter adjustment instruction to obtain the first display region of the video comprises:

parsing the parameter adjustment instruction to obtain an adjustment parameter;

determining a region parameter of the display region of the video in the play application;

adjusting the region parameter based on the adjustment parameter; and updating the display region of the video in the play application based on an adjustment result to obtain the first display region.

15. The system according to claim 12, wherein the parameter adjustment instruction comprises at least one of a region size adjustment instruction, a region rotation adjustment instruction, or a region position adjustment instruction, and wherein the adjusting a display region of the video in the play application comprises at least one of:

performing a size adjustment on the display region of the video in the play application;

performing a rotation adjustment on the display region of the video in the play application; or performing a position adjustment on the display region of the video in the play application.

16. The system according to claim 11, wherein the obtaining a video and at least one bullet screen component associated with the video comprises:

receiving the video and bullet screen component data associated with the video from a server in response to selecting the video from a video list in the play application;

parsing the bullet screen component data to obtain display time data and display coordinate data;

determining a component display period of displaying the at least one bullet screen component in the video based on the display time data;

determining a component display region of displaying the at least one bullet screen component based on the display coordinate data;

configuring the at least one bullet screen component based on the component display region;

displaying the video carrying the at least one bullet screen component through the play application; and displaying the at least one bullet screen component in response to determining that display of the video by the play application reaches a start point of the component display period.

17. The system according to claim 11, wherein the operations further comprise:

determining that there is a second function control associated with the first function control; and updating a display state of the second function control based on the updated display effect of the first function control.

18. A non-transitory computer-readable storage medium, storing computer-readable instructions that upon execution by a processor cause the processor to implement operations comprising:

obtaining a video and at least one bullet screen component associated with the video, wherein the at least one bullet screen component comprises at least one function control configured to perform a corresponding function associated with the video based on the user input, and wherein the at least one function control comprises at least one of a control configured to follow a publisher of the video, a control configured to send a virtual gift to the publisher of the video, a control configured to collect the video as a favorite, or a control configured to give a like to the video;

determining a relative position relationship between the at least one bullet screen component and a play application, and loading the at least one bullet screen component and the video to the play application based at least in part on the relative position relationship;

displaying on a computing device the video in a first display region and the at least one bullet screen component in a second display region, wherein the second display region is located within the first display region;

generating an effect of embedding the at least one function control in the video by maintaining a relatively motionless relationship between the first display region and the second display region while playing the video in the play application, wherein the maintaining the relatively motionless relationship comprises at least one of synchronously scaling down the first display region and the second display region without scaling downing a play application window of the play application, synchronously rotating the first display region and the second display region without rotating the play application window, or synchronously translating the first display region and the second display region without translating the play application window;

receiving an instruction from a user via the at least one bullet screen component displayed in the second display region;

determining a first function control among the at least one function control comprised in the at least one bullet screen component in response to receiving the instruction; and changing a display state of the first function control to an updated display effect different from a display effect that was presented before receiving the instruction from the user.

19. The non-transitory computer-readable storage medium according to claim 18, wherein after the displaying the video and the at least one bullet screen component, the operations further comprise:

in response to receiving a parameter adjustment instruction via the play application, adjusting a display region of the video in the play application based on the parameter adjustment instruction to obtain the first display region of the video;

updating a display region of the at least one bullet screen component in the play application based on the first display region and the relative position relationship to obtain the second display region of the at least one bullet screen component.

* * * * *